US011833731B2

United States Patent
Senn et al.

(10) Patent No.: US 11,833,731 B2
(45) Date of Patent: Dec. 5, 2023

(54) BLOW MOULDING MACHINE WITH TEMPERED BASE MOULD

(71) Applicant: KRONES AG, Neutraubling (DE)

(72) Inventors: Konrad Senn, Alteglofsheim (DE); Andreas Pense, Obertraubling (DE); Markus Kulzer, Zell (DE)

(73) Assignee: KRONES AG

( * ) Notice: Subject to any disclaimer, the term of this patent is extended or adjusted under 35 U.S.C. 154(b) by 0 days.

(21) Appl. No.: 17/522,463

(22) Filed: Nov. 9, 2021

(65) Prior Publication Data
US 2022/0143896 A1    May 12, 2022

(30) Foreign Application Priority Data

Nov. 9, 2020    (DE) .................... 10 2020 129 415.8

(51) Int. Cl.
*B29C 49/48*    (2006.01)
*B29L 31/00*    (2006.01)

(52) U.S. Cl.
CPC ...... *B29C 49/4823* (2013.01); *B29C 49/4802* (2013.01); *B29C 2049/4825* (2013.01); *B29C 2049/4848* (2013.01); *B29L 2031/7158* (2013.01)

(58) Field of Classification Search
CPC ........ B29C 49/4823; B29C 2049/4825; B29C 2049/4848
See application file for complete search history.

(56) References Cited

U.S. PATENT DOCUMENTS

| 3,768,948 | A | * | 10/1973 | Horberg, Jr. | ........ B29C 49/4823 425/526 |
| 6,112,804 | A | * | 9/2000 | Sachs | ..................... B33Y 10/00 249/80 |
| 2005/0048155 | A1 | * | 3/2005 | Tsau | ................... B29C 49/4823 425/522 |
| 2011/0223275 | A1 |  | 9/2011 | Dagorn et al. | ......... B29C 49/56 |

(Continued)

FOREIGN PATENT DOCUMENTS

FR    3088234    11/2018    ............. B29C 49/48

OTHER PUBLICATIONS

Rosato et al, Blow Molding Handbook, 1989, Hanser Publishers, first edition, pp. 104-106. (Year: 1989).*

(Continued)

*Primary Examiner* — Robert B Davis
(74) *Attorney, Agent, or Firm* — HAYES SOLOWAY P.C.

(57) ABSTRACT

An apparatus for forming plastic preforms into plastic containers with at least one forming station which forms the plastic preforms into the plastic containers by the action of a flowable medium, wherein the forming station has a blow mould which forms a cavity, within which the plastic preforms are formed into the plastic containers. The blow mould has a base part which has an inner contour which forms a base of the containers, wherein the base part has at least one channel for conducting a temperature control medium for temperature control of the base part. A course of the channel is adapted to a course of the inner contour and/or the channel has, on its inner surface facing the temperature control medium, structures and/or cross-sectional changes which influence the flow of the temperature control medium through the channel.

19 Claims, 6 Drawing Sheets

(56) References Cited

U.S. PATENT DOCUMENTS

2016/0325483 A1    11/2016  Langlois et al. ........ B29C 49/48
2017/0232656 A1*   8/2017   Derrien ................... B29C 49/12
                                                        264/523
2020/0346392 A1    11/2020  Sandrini ............. B29C 49/4823

OTHER PUBLICATIONS

Ugural, Mechanical Design of Machine Components, 2015, Second Edition, CRC Press, pp. 921-932. (Year: 2015).*
European Official Action issued in European Patent Application Serial No. 21206577.5, dated Apr. 8, 2022, 11 pages, with translation.

* cited by examiner

BLOW MOULDING MACHINE WITH TEMPERED BASE MOULD

BACKGROUND OF THE INVENTION

The present invention relates to a device for forming plastic preforms into plastic containers. Such devices have been known in the prior art for a long time. In this process, heated plastic preforms are fed into blow moulds and expanded within these blow moulds into plastic botties or plastic containers by the application of a flowable medium, usually blowing air, but more recently also in some cases a liquid product.

These blow moulds usually have side parts and a base part which can be closed and thus form the space within which the plastic preform is expanded.

In the prior art, it is also known to temper, i.e. heat or cool, parts of this blow mould, such as the side parts or, in particular, the base part, which is used to form the base of the container. For this purpose, it can be helpful to maintain a uniform temperature of the bottom part even over a longer processing time.

In order to achieve this temperature control, it is known from the prior art that a channel is arranged, for example, on or in a base part, through which a flowable medium is passed which enables said temperature control.

In the prior art, such base parts are usually one-piece components which have a milled spiral through which a temperature control medium, and in particular a coolant, flows in via an opening and flows out again via a further opening. By flowing through this spiral, heat energy is extracted in the entire base cup and transported away via the coolant. In the prior art, the inflow partly takes place directly in the center of the base. In the prior art, this spiral has a flat surface.

Due to ever increasing demands on machine output rates, ever better heat transport in the base is becoming necessary from a process engineering point of view. The spiral structure used in the state of the art is reaching its limits and in many cases is no longer sufficient to guarantee a stable process. Due to its simple contour, the spiral is not always suitable for ensuring cooling, in particular of the inner surface against which the plastic preform or plastic material is applied. In this way, at high machine speeds, the cooling function cannot be achieved, especially at the base, which is particularly important for the containers.

The present invention is therefore based on the object of creating a base cup or a base part which permits an improved tempering effect and, in particular, a cooling effect of the plastic preform to be inserted. In addition, according to the invention, a device is to be provided which permits a higher machine effect.

SUMMARY OF THE INVENTION

A forming apparatus according to the invention for forming plastic preforms into plastic containers has at least one forming station which forms the plastic preforms into the plastic containers (for example plastic bottles) by being acted upon by a flowable medium, wherein the forming station has a blow mould which forms a cavity within which the plastic preforms can be formed and/or shaped into the plastic containers and this blow mould has a base part which has and/or forms an inner contour which forms a base of the containers. Thereby, said base part comprises at least one channel for conducting a temperature control medium for temperature control the base part.

According to the invention, this channel is adapted to a course of the inner contour and/or the channel has structures on its inner surface facing the temperature control medium and/or cross-sectional changes which influence the flow of the temperature control medium through the channel.

Two measures are therefore proposed, each of which, however, serves to achieve more efficient temperature control and, in particular, cooling of the base part. In one measure, the channel or its course is also adapted to the course of the inner contour. In this way, the distance between the channel and the inner contour can be reduced and, in this way, the temperature control effect can be increased. In addition, a uniform distribution of the temperature control over the base geometry can be made possible in this way. In the second measure, structures or cross-sectional changes are deliberately formed, which have the effect that a stronger temperature control and/or a stronger temperature exchange takes place in the predetermined areas of the base part.

In a preferred embodiment, the channel substantially follows a topography of the inner surface of the base part. Preferably, the inner contour or inner surface of the base part is a negative of the base of the container to be manufactured.

In a further advantageous embodiment, the forming station comprises a rod-like body, in particular a so-called stretching rod, which can be inserted into the plastic preforms in order to stretch them in their longitudinal direction.

In a further preferred embodiment, the forming station has an application device which acts upon the plastic preforms with a flowable and, in particular, a gaseous medium in order to expand them. Preferably, this application device is a so-called blowing nozzle which can be applied to a mouth of the plastic preforms to be expanded.

Preferably, the device comprises a transport device for transporting the plastic containers, in particular a transport device which transports the plastic preforms also during their forming.

In a further advantageous embodiment, the device has a movable and, in particular, a rotatable carrier (which is preferably a component of this transport device), on which a plurality of the forming stations described herein are arranged. In this embodiment, the forming of the plastic preforms into the plastic containers preferably takes place during a transport of these plastic preforms.

In a preferred embodiment, the base part has an inlet for the temperature control medium and/or an outlet for the temperature control medium. Preferably, this inlet and this outlet are arranged from different positions of the base part, in particular at different positions in a radial direction of the base part. It is possible that the inlet and/or the outlet is arranged in a center of the base part.

Preferably, the channel described herein is a channel closed in its circumferential direction, i.e. in particular a channel formed in the manner of a pipeline. This can have, for example, a circular profile but also a profile deviating from here. Preferably, the temperature control described above is a cooling of the base part.

In a preferred embodiment, the base part is made of an alloy and in particular a wrought alloy and in particular a wrought aluminium alloy. Preferably, the base part is formed in one piece, but a two-piece design would also be conceivable.

Preferably, there is a substantially continuous flow of temperature control medium (or temperature control medium) or coolant flow within the channels. In a preferred embodiment, therefore, a single-part or multi-part base mould or a base part is proposed, the cooling of which, in particular, follows the inner contour or the shape of the base contour continuously and closely and thus fulfils a better temperature control and, in particular, cooling function (a heating function would also be conceivable) even in areas which are critical in terms of process technology.

In a preferred embodiment, the channel is spiral at least in sections. In this case, it is possible that, starting from an inflow, the temperature control medium flows in a spiral towards an outflow, which can, for example, be arranged in the centre of the base part. Preferably, this spirally formed channel is not, as known in the prior art, formed as a spiral which runs in one or two planes, but is preferably, as mentioned above, adapted to a topography of the inner contour of the base part.

In a preferred embodiment, the channel, which is designed in particular as a spiral channel, follows the base geometry or the inner contour at a defined distance and, in particular, follows it continuously at a defined distance.

As mentioned, in one embodiment, the spiral has a structured surface, wherein the structured surface particularly also means protrusions and constrictions on the inner wall of the spiral or the channel.

In a further preferred embodiment, the spiral forms more than one revolution, preferably more than two rotations and preferably three or more rotations. In a further preferred embodiment, the spiral forms less than ten rotations, preferably less than eight rotations and more preferably less than seven rotations. This choice of rotations has been shown to allow efficient cooling of the base part. Preferably, the spiral winds around a geometric centre of the base part and/or of a region of the base part which also forms the geometric centre of the base of the container.

In a further preferred embodiment, the spiral is interrupted in its flow by elements and, for example, webs. In this way, cross-sectional constrictions and thus preferably turbulences can be generated, which enable efficient cooling especially at critical areas.

Furthermore, it would also be possible for the channel or the spiral channel to have "constrictions" of the flowed-through channel or breakthroughs at critical points in order to specifically place a cooling effect.

In a further preferred embodiment, the channel has a predetermined distance from the inner contour and/or a course of the channel is adapted in a height direction of the base part at least in sections to a course of the inner contour. In this way, overall, a smaller distance can be created between the inner contour and the channel.

Preferably, the channel has a distance to the inner structure which is (in particular always) smaller than 10 mm, preferably smaller than 8 mm, preferably smaller than 6 mm and particularly preferably smaller than 4 mm. In a further preferred embodiment, the channel has a distance from the inner structure which is (in particular always) greater than 0.5 mm, preferably greater than 1 mm and preferably greater than 1.5 mm. By means of these chosen distances, the cooling effect of the base part (or, if appropriate, a heating effect or, in general, a temperature control effect) can be increased overall. On the other hand, however, care must be taken to ensure sufficient compressive strength, and the effort of manufacturing, in particular of a milling tool, must also be taken into account. Preferably, the internal structure is a milled internal structure.

In the embodiment described herein, this changes a height level of the channel, wherein preferably those regions of the channel that are closest to the inner contour are to be considered for these distance considerations. It would also be conceivable that a cross-section of the channel ends here and/or the boundaries of the channel follow the changes in the height level of the inner contour.

In particular, the height direction of the base part is understood to be the direction which extends in the longitudinal direction of the plastic preforms during their expansion.

Preferably, said channel always has substantially the same distance from the inner contour, wherein this being understood to mean in particular a local distance of the channel from the inner contour. Preferably, the distance of said channel from the inner contour of the base part does not deviate from a predetermined average value by more than 20% over its entire extension, preferably by no more than 15% and preferably by no more than 10%.

Excluded from these deviations are, in particular, those areas in which vent ducts run, such as areas in which the feet of the container are formed. In such areas, it may be necessary to route the channels described here around a vent (line). Following the base contour is only possible again after such areas.

In a preferred embodiment, the structures are formed as protrusions and/or webs which extend into the channel. For example, such webs may be formed for the purpose of steering and/or for increasing the contact surfaces and/or as supporting elements of the mould contour.

For example, triangular or jagged projections may be provided which extend into the channel and, in particular, extend into the channel starting from an inner wall of the channel. Through these protrusions, as mentioned above, turbulence of the flowable medium passing through the channel can be achieved. In a further advantageous embodiment, webs are arranged in the channels. In this case, specific changes in the cross-sectional area through which the flow passes can be achieved.

In a preferred embodiment, recesses are provided adjacent to these webs and, in particular, below the webs recesses are provided, wherein in particular, bores which establish or deflect the coolant flow.

Preferably, these bores have a diameter that is between 2 mm and 10 mm, preferably between 3 mm and 8 mm and more preferably between 4 mm and 6 mm.

Particularly preferred, these webs or in general these structures of the channel are below those areas of the base mould which are critical or have to be particularly tempered and in particular cooled. These are in particular those areas which form so-called tension bands in the finished container. These tension bands must have a high stability and are relatively critical during the production of the plastic containers.

In another preferred embodiment, the channel has constrictions and narrowings at least in sections. Generally, these are changing cross-sections. These are provided in particular at such critical points of the base part which have to be particularly tempered and in particular cooled. In such areas, in which the channel cross-section becomes smaller, heat can be transported away particularly well.

In a further preferred embodiment, a predetermined area of the base part can be tempered by the channel and an area of this area has a size which has a predetermined proportion of a projection area which is formed by a projection in the longitudinal direction of the base part of the largest diameter of a contour designed in the base cup or base part, and this proportion is between 10% and 80%, preferably between 15% and 70% and particularly preferably between 20% and 60%.

Therefore, that area of the base part which serves to form the base is compared with that area of the base part (in particular the area in a cross-sectional surface) which is covered by the cooling effect, or in which the cooling or tempering effect occurs. Thus, it is possible that only a relatively small area is cooled compared to the total cross-sectional area of the base part. In particular, this may be a central region of the base part. Preferably, these said surfaces are each rotationally symmetrical surfaces which are rotationally symmetrical with respect to a longitudinal direction of the base part (and/or an axis of symmetry of the base part).

The present invention is further directed to a base portion of a blow mould for forming plastic preforms into plastic containers, which has or forms an inner contour that forms a base of the containers, wherein said base part having at least one channel for conducting a temperature control medium to temperature control of the base part.

According to the invention, a course of the channel is adapted to a course of this inner contour and/or the channel has structures and/or cross-sectional changes on its inner surface facing the temperature control medium, which influence the flow of the temperature control medium through the channel. These structures can also be webs which, similar to cooling fins, increase a (flow) surface. Thus, preferably also as mentioned above, the cooling effect of this channel or the base part can be changed, in particular also locally.

In a preferred embodiment, the base part is formed in the manner described above. The invention is further directed to a mould, and in particular a blow mould, for forming plastic preforms into plastic containers having a base part of the type described above. Preferably, this mould also comprises at least one and preferably two side parts which, together with the base part, form the cavity suitable for forming the containers.

In a preferred embodiment, the base part comprises at least one temperature detection device which detects a temperature in particular inside the base part and in particular in the vicinity of the channel. Preferably, the base part comprises several temperature detection devices for detecting the temperature of the base part.

The present invention is further directed to a method for forming plastic preforms into plastic containers, wherein by means of a forming station the plastic preforms are formed into the plastic containers by being acted upon by a flowable medium and in particular a gaseous medium, and wherein the forming station comprises a blow mould, which forms a cavity inside which the plastic preforms are formed into the plastic containers, and this blow mould having a base part which in turn has an inner contour which forms a base of the containers, and wherein this base part having at least one channel through which a temperature control medium is passed in order to temperature control the base part.

According to the invention, a course of the channel is adapted to a course of the inner contour and/or the channel has structures and/or cross-sectional changes on its inner surface, which influence the flow of the temperature control medium through this channel.

In a further preferred method, the coolant flow or the temperature control medium flow through the channels is at least temporarily controlled and/or changed. Preferably, the flow of the temperature control medium through the channel is also controlled as a function of a temperature of the base part. In addition, a control as a function of other variables would also be considered, for example a control as a function of a production speed.

BRIEF DESCRIPTION OF THE DRAWINGS

Further advantages and embodiments will be apparent from the accompanying drawings.

In the drawings.

DETAILED DESCRIPTION OF THE INVENTION

Figure 1:
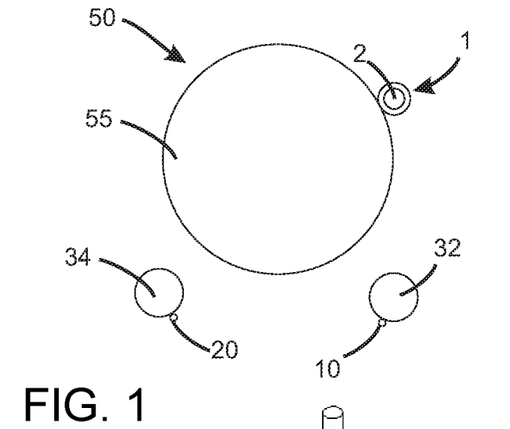
FIG. 1 shows a roughly schematic representation of a device for forming plastic preforms into plastic containers.

FIG. 1 shows a schematic representation of a device 50 for forming plastic preforms 10 into plastic containers 20. Plastic preforms 10 are fed to forming stations 1 (only one shown) for forming by means of a feed device 32, such as a feed starwheel. The reference sign 34 indicates a discharge device, such as a discharge starwheel, which discharges the manufactured plastic containers from the device 50.

These forming stations 1 are arranged on a (in particular rotatable) carrier 55. The forming stations 1 each have blow moulds 2 which are used to form the containers 20.

Figure 2:
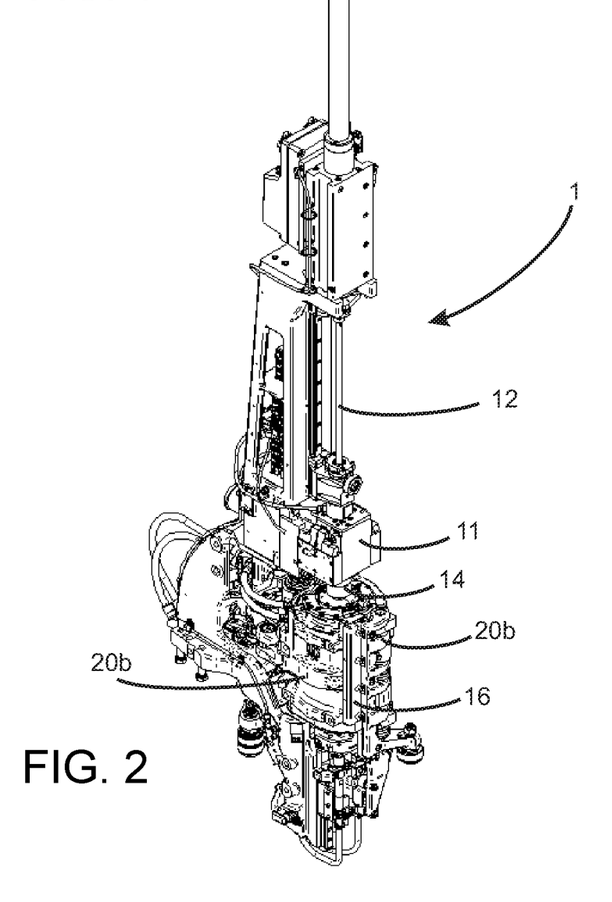
FIG. 2 shows a representation of a forming station.

FIG. 2 shows a representation of a forming station 1 for forming plastic preforms into plastic containers. This has two blow mould carriers 20a and 20b which can be pivoted with respect to each other in order to feed plastic preforms into an internal blow mould (not shown). Reference numeral 16 indicates a locking mechanism that locks the two blow mould carriers 20a and 20b together in a closed state.

The reference sign 14 schematically indicates an application device which moves from above to the mouth edge of the (not shown) plastic preform in order to expand it. The reference sign 11 denotes a blowing block, in particular a valve arrangement, via which the blowing pressures can be controlled and regulated. The reference sign 12 denotes a stretching rod which can be inserted into the (not shown) plastic preforms in order to stretch them in their longitudinal direction.

Figure 3:
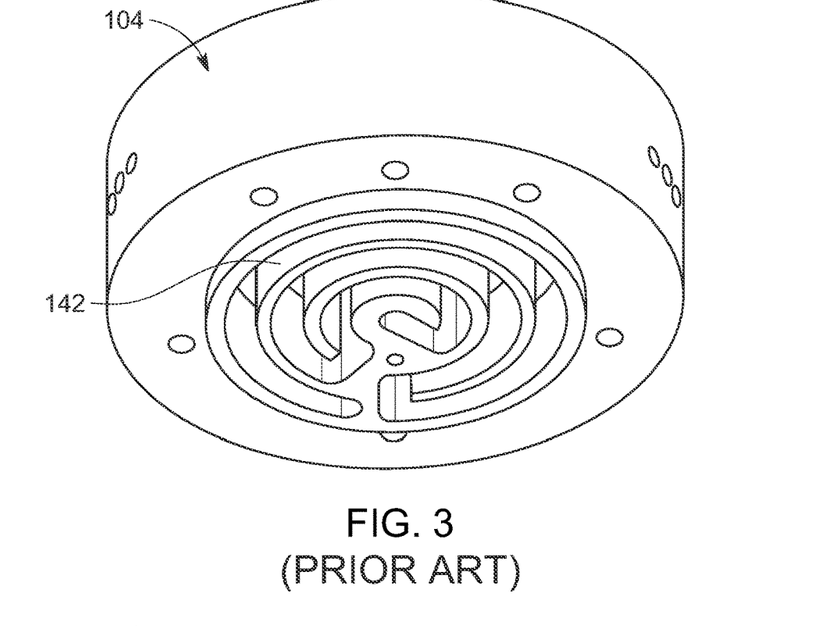
FIG. 3 shows a representation of a base part according to the internal prior art of the applicant.

FIG. 3 shows a representation of a base part 104 from the internal prior art of the applicant. This has a spiral-shaped channel for conducting a temperature control medium. This channel has a uniform height or runs in two planes, and thus its distance from this channel 142 to the (not shown) inner contour of the base part also changes.

Figure 4:
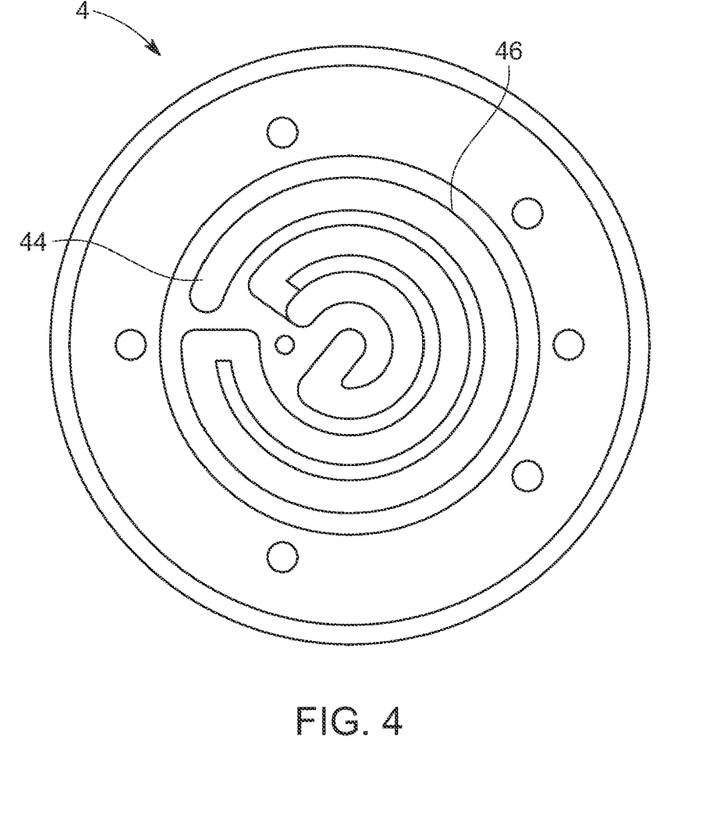
FIG. 4 shows a first representation of a base part according to the invention.

FIG. 4 shows a schematic representation of a base part 4 according to the invention. Here, too, a channel 44 is provided which is designed in a spiral shape and here has approximately two to three rotations. This channel preferably has a uniform cross-section here. The reference signs 46 indicate projections which are formed in the interior of this channel. These projections 46 or structures generate turbulence in the temperature control medium flowing through the channel 44, which generates an improved cooling effect in certain areas of the base part 4.

Figure 5:
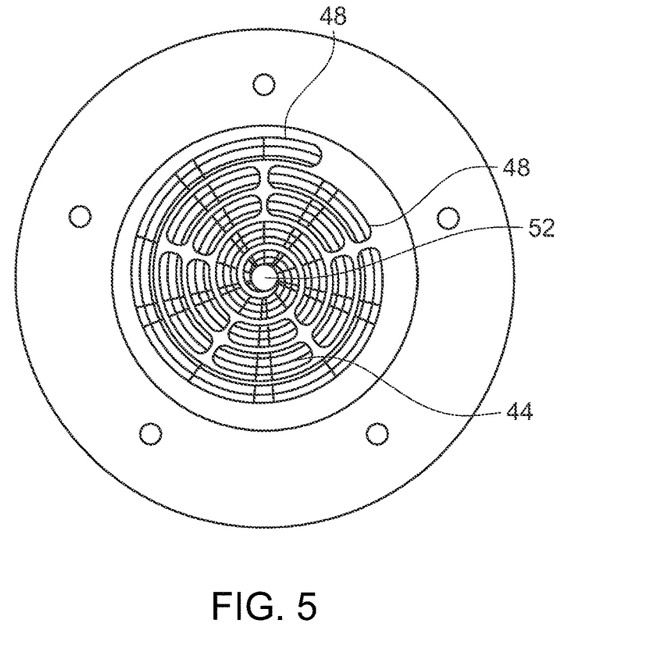
FIG. 5 shows a further representation of a base part according to the invention.

FIG. 5 shows another view of a base part. The reference sign 52 indicates an inlet for the temperature control medium.

The channel or the groove here is designed—referring to its depth—following the base design, as mentioned above. In the area of tension bands, however, the groove would have become so deep that the flow velocity would have decreased too much. Therefore, the grooves were interrupted at these points and only connected with each other via a deeper breakthrough.

This forces the temperature control medium to follow the path along the bottom of the groove, which should promote or maintain the cooling effect at these points. Thus, the webs are preferably used only at particularly deep positions (especially at the tension bands). In the concrete case, there are thus 5 positions, because a petaloid base also has exactly 5 tension bands.

Figure 6A:
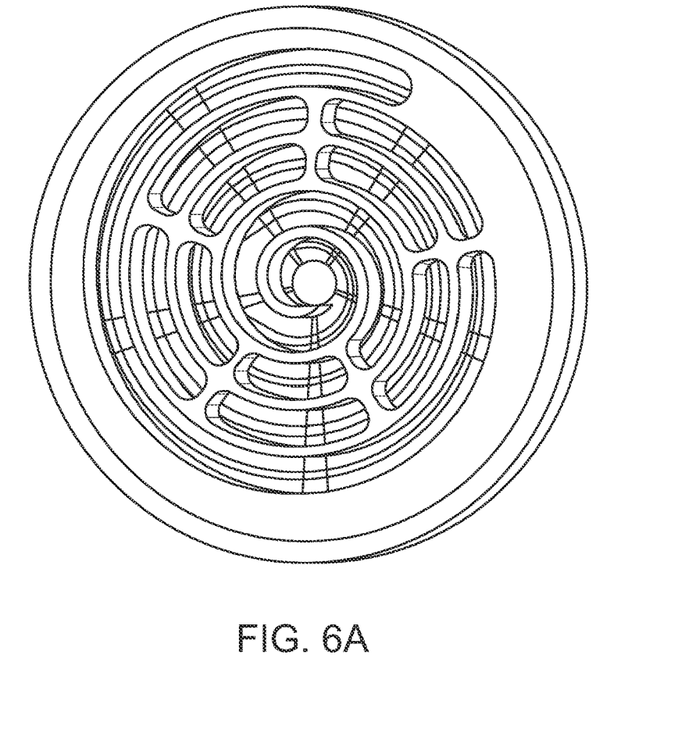
FIG. 6a, 6b shows two representations for illustrating a base part according to the invention.
Figure 6B:
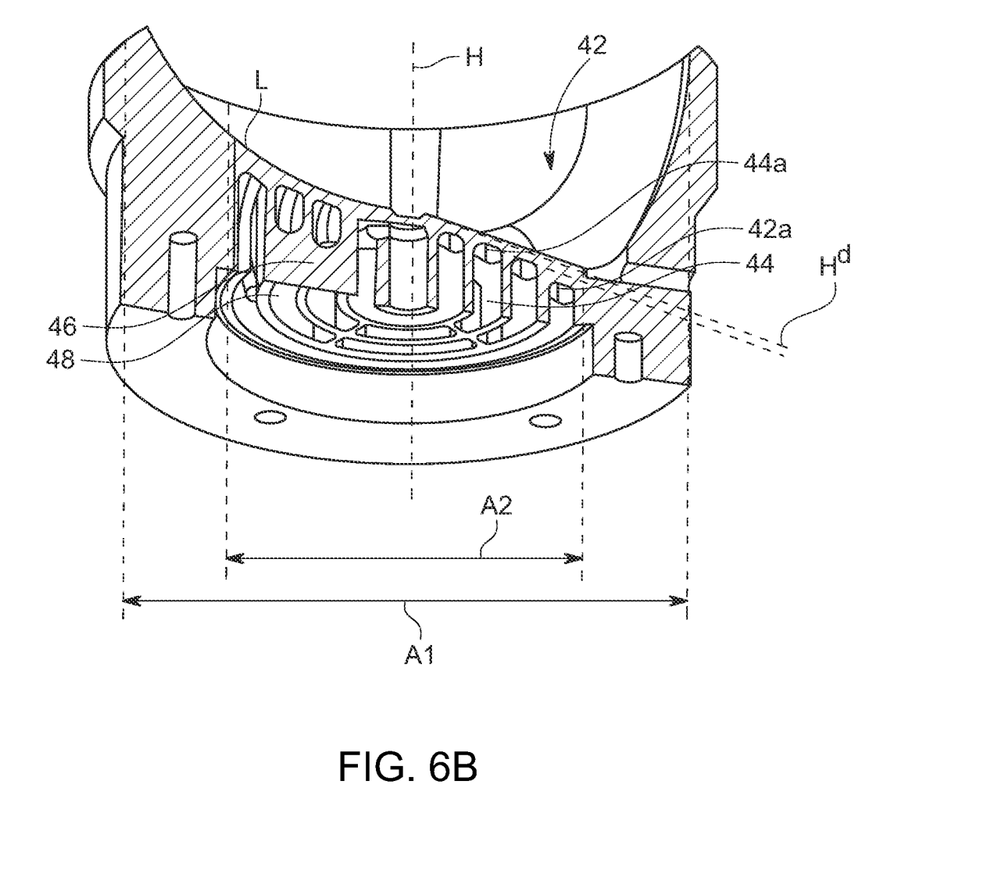

FIGS. 6a and 6b show a comparison to illustrate these structures. In this embodiment, recesses 48 are provided which serve to deflect the temperature control medium. It can be seen that (compare FIG. 6a) the channels 44 are brought up to the inner contour 42 of the base part. The reference signs 44a refer to the ends of the respective channel which has the shortest distance d to the inner contour 42. The inner contour is preferably a negative of the container to be produced.

The reference signs 46 indicate webs which project into these channels. In the area of these webs, the channels have a smaller cross-section. The temperature control medium is deflected in the grooves or recesses 48 below. This deflection improves the temperature control and in particular the cooling effect in certain critical areas. As can be seen from FIG. 6b, these are, for example, areas in which the base part forms a tension band of the container, i.e. along the line L shown in FIG. 6b. The reference sign H indicates the height direction (in relation to the inner contour 42) and thus also the longitudinal direction of the base part. Preferably, the channel follows the inner contour in this height direction H.

The reference sign A1 indicates a projection surface which results when the inner contour 42 is projected in the longitudinal direction H of the base part. The reference sign A2 indicates a projection surface which results when that region of the base part which is tempered and/or that region in which the channel 44 is present is projected in the longitudinal direction H of the base part.

Figure 7A:
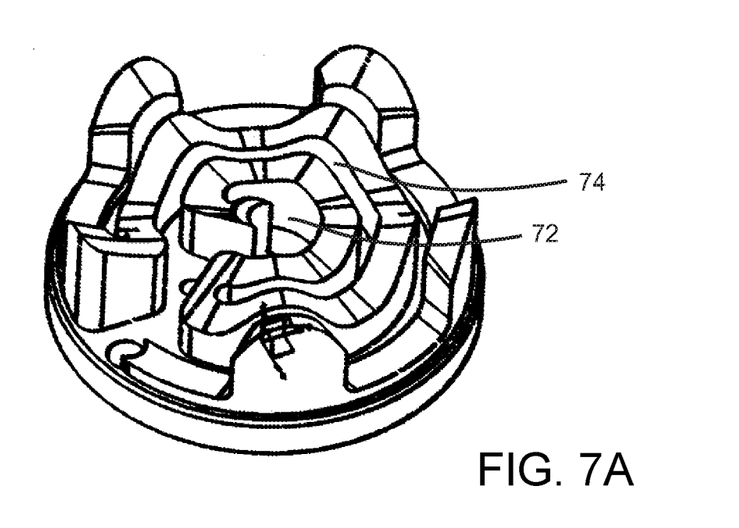
FIGS. 7a to 7c show three representations of a multi-part base part.
Figure 7B:
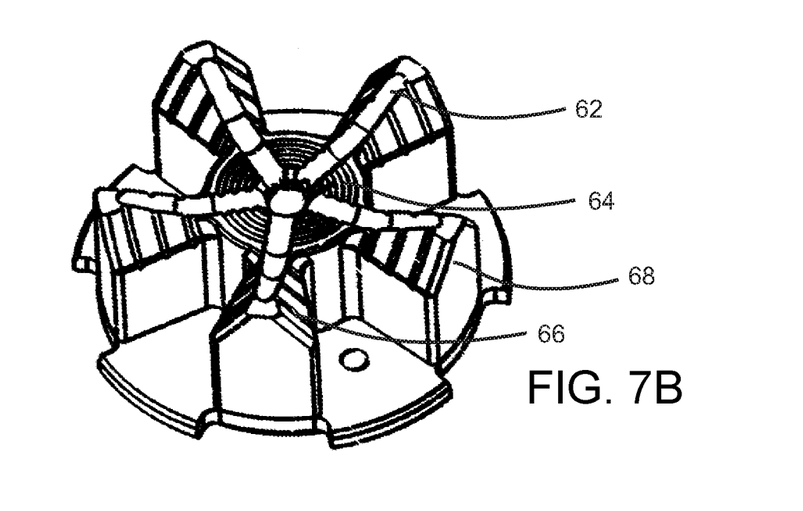
Figure 7C:
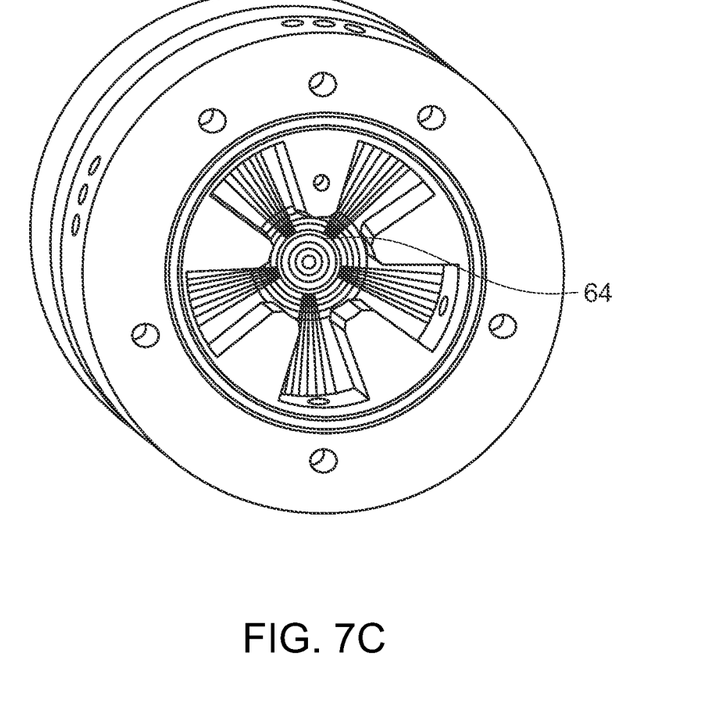

FIGS. 7a to 7c show three embodiments of a multi-part or, in this case, two-part base part.

The illustrations of FIGS. 7b and 7c belong together. FIG. 7b shows the insert for FIG. 7c. The subject matters of FIGS. 7b and 7c together create a star-shaped cavity in which the cooling medium spreads out parallel in 5 directions (radially). The majority of the flow runs here via the "comb" described with figure 62 up to the highest point of the insert and from there into a radially continuing bore in the base cup.

The hole crosses after a few mm with a second hole, which deflects the cooling medium approx. 150° and sends it back to the insert. There it runs down the outside 68 of the 5 domes (the area that looks like the gable end of a house) and out of the mould again via a collecting ring underneath (not visible here).

Parallel to this 1st flow path, smaller quantities of cooling medium can also run down the domes to the left and right "of the path" (in the example of the house, this would be the gable roof surfaces and the longitudinal side of the house). This water also flows into the collecting ring again. Grooves and ridges in both parts should artificially increase the surface somewhat or favour flow paths.

In the representation shown in FIG. 7a, the inner contour is shown but not a representation corresponding to FIG. 7c.

The cooling starts in the middle 72 and continues here in a true spiral shape to the outside, where the water exits the mould again. As in the prior art, the temperature control medium runs along a groove 74 in the base cup. This groove represents the boundary of the channel (with rectangular cross-section) in 3 sides. Here, too, the depth is now kept variable. In order to maintain the flow velocity in deep places, the dividers with openings at the bottom were used, as in FIG. 5. Here, in this variant, the same objective is pursued with the aid of an insert (FIG. 7a). In the inserted state, this represents the fourth side of the channel and ensures an absolutely constant flow cross-section along the entire cooling section.

The applicant reserves the right to claim all features disclosed in the application documents as essential to the invention, provided that they are individually or in combination new compared to the prior art. It is further pointed out that the individual figures also describe features which may be advantageous in themselves. The skilled person immediately recognizes that a particular feature described in a figure can be advantageous even without adopting further features from that figure. Furthermore, the skilled person recognizes that advantages can also result from a combination of several features shown in individual figures or in different figures.

The invention claimed is:

1. A forming apparatus for forming plastic preforms into plastic containers, said forming apparatus having at least one forming station for forming the plastic preforms into the plastic containers by being acted upon by a flowable medium, wherein the forming station has a blow mould having a cavity within which the plastic preforms are formed into the plastic containers, wherein the blow mould has a base part which has an inner contour which forms a base of the containers, and wherein the base part has at least one channel for conducting a temperature control medium for temperature control of the base part, wherein a course of the channel is adapted to a course of the inner contour and the channel has, on its inner surface facing the temperature control medium, structures and cross-sectional changes which influence the flow of the temperature control medium through the channel, wherein the structures are formed as protrusions or webs extending into the channel and wherein recesses are provided adjacent to the webs, wherein bores are provided configured to establish or deflect a coolant flow.

2. The apparatus according to claim 1, wherein the channel is at least in sections spiral.

3. The apparatus according to claim 2, wherein the spiral has more than one rotation, or the spiral forms less than ten rotations.

4. The apparatus according to claim 1, wherein the channel has a predetermined distance to the inner contour and a course of the channel in a height direction of the base part is adapted at least in sections to the course of the inner contour.

5. The apparatus according to claim 1, wherein the channel has a distance to the inner contour which is smaller than 10 mm and/or the channel has a distance to the inner contour which is larger than 0.5 mm.

6. The apparatus according to claim 1, wherein the channel comprises constrictions or narrowings at least in sections.

7. The apparatus according to claim 1, wherein a predetermined region of the base part can be tempered by the channel and a surface of said predetermined region has a size which has a predetermined proportion of a projection surface which is formed by a projection in a longitudinal direction of the base part of the largest diameter of a contour designed in the base cup and the proportion is between 10% and 80%.

8. A base part of a blow mould for forming plastic preforms into plastic containers, which has an inner contour which forms a base of the containers, wherein this base part has at least one channel for conducting a temperature control medium for temperature control of the base part, wherein
   a course of the channel is adapted to a course of the inner contour and the channel has structures and cross-sectional changes on its inner surface facing the temperature control medium which influence the flow of the temperature control medium through the channel, wherein the structures are formed as protrusions or webs extending into the channel and wherein recesses are provided adjacent to the webs, wherein bores are provided configured to establish or deflect a coolant flow.

9. A method for forming plastic preforms into plastic containers, wherein the plastic preforms are formed into the plastic containers by action of a flowable medium in a forming station, wherein the forming station has a blow mould which forms a cavity within which the plastic preforms are formed into the plastic containers, and this blow mould has a base part which has an inner contour and which forms a base of the containers, and wherein this base part has at least one channel through which a temperature control medium for temperature control of the base part is passed, wherein
   a course of the channel is adapted to a course of the inner contour and the channel has, on its inner surface facing the temperature control medium, structures and cross-sectional changes which influence the flow of the temperature control medium through the channel, wherein the structures are formed as protrusions or webs extending into the channel and wherein recesses are provided adjacent to the webs, wherein bores are provided configured to establish or deflect a coolant flow.

10. The apparatus according to claim 1,
   wherein jagged projections are provided which extend into the channel starting from an inner wall of the channel.

11. The apparatus according to claim 1, wherein
the base part is made of an alloy.

12. The apparatus according to claim 11, wherein
the base part is made of a wrought aluminium alloy.

13. The apparatus according to claim 1, wherein
the channel, which is designed as a spiral channel, follows the base geometry of the inner contour at a defined distance and follows it continuously at a defined distance.

14. The apparatus according to claim 1, wherein
the webs are configured to steer and/or increase the contact surfaces and/or as supporting elements of the mould contour.

15. The apparatus according to claim 1, wherein
the base part comprises at least one temperature detection device configured to detect a temperature inside the base part.

16. The method according to claim 9, wherein
the coolant flow or the temperature control medium flow through the channels is at least temporarily controlled and/or changed.

17. The method according to claim 16, wherein
the flow of the temperature control medium through the channel is also controlled as a function of a temperature of the base part.

18. The method according to claim 16, wherein
a control as a function of a production speed is provided.

19. The apparatus according to claim 15, wherein
the at least one temperature detection device configured to detect a temperature in vicinity of the channel.

* * * * *